United States Patent Office 3,225,069
Patented Dec. 21, 1965

3,225,069
PROCESS OF PRODUCING ESTERS OF HYDROXY-METHYLTETRAHYDROFUROIC ACID
Baak W. Lew, Wilmington, Del., assignor to Atlas Chemical Industries, Inc., Wilmington, Del., a corporation of Delaware
No Drawing. Filed Apr. 18, 1963, Ser. No. 273,851
3 Claims. (Cl. 260—347.5)

The present invention relates to a process for the production of hydroxymethyltetrahydrofuran derivatives and in particular, to the production of esters of hydroxymethyltetrahydrofuroic acid (HMTHFA) by a hydrogenation and esterification reaction involving hydroxymethyl furoic acid (HMFA) and an alcohol.

In accord with the present invention, HMTHFA esters are initially prepared by reacting hydrogen, hydroxymethylfuroic acid and an alcohol. The reaction involves the simultaneous hydrogenation and esterification of HMFA. Alcohols suited to use in the present invention may be saturated or unsaturated aliphatic alcohols. Alcohols having a carbon chain length of from 1 to about 12 atoms are aptly suited to use. An excess of alcohol is useful in the present reaction to prevent undesired polymerization. An excess of between about 5 and about 15 mols of alcohol per mol of acid is generally found to be eminently satisfactory. The present process is effectively carried out in the presence of a noble metal catalyst. While a wide variety of catalysts are suitable for use in the process of the present invention, it has been found that satisfactory results are obtained with noble metal catalysts supported on materials such as kieselguhr, charcoal, or activated clay. The reaction suitably takes place at a reasonable rate in the presence of from about 0.1 to about 5.0% of a noble metal catalyst (based on the weight of the HMFA starting material). Usually amounts of catalyst of over 5.0% yield no obvious improvement in the reaction.

The process of the present invention takes place over a relatively short period of time as compared to analogous prior art hydrogenations or esterfications. Generally the process of the present invention is complete within a time period of 3 hours or less. The reaction conditions are maintained for a sufficiently long time that the reaction is substantially completed and a respectable yield in the order of at least 80% of the theoretical is obtained. A reaction time of from about 0.5 to about 3.5 hours has been found to be eminently satisfactory.

The pressure at which the reaction of the present invention takes place is not critical within a rather wide range. For example, while a slight pressure, about 30 p.s.i.g., is desirable to facilitate an efficient hydrogenation rate, no upper limit, except that dictated by equipment limitations, can be set.

The present invention utilizies temperatures which are sufficiently high to carry out the reaction at a reasonable rate but not sufficiently high to cause degradation of the starting material or product. Temperatures of up to 150° C. generally may be employed without difficulty due to degradation. Temperatures of 25° C. and higher generally cause the reaction to proceed at a practicable rate. A temperature range of between 25° C. and 150° C. has been found to be entirely satisfactory for carrying out the present reaction.

A crude ester product may be recovered from the hydrogenation product by stripping off the excess alcohol. A purified product may be recovered by distilling the crude product under a reduced pressure. The present process also produces a polymerized ester product, referred to hereinafter as a di-ester product. The di-ester product is usually produced in amounts ranging from about 10% to about 15% by weight of the mono-ester product. The di-ester product is a viscous syrup and may be recovered as a second distillation fraction from the crude ester product.

The following examples are illustrative of the process of the present invention:

Example 1

100 gms. of HMFA (0.705 mol), 1 liter of n-butyl alcohol and 10 gms. of 10% palladium on charcoal were reacted in an autoclave under a pressure of 2100 p.s.i.g. and at a temperature of 100° C. for a period of 3 hours. The reaction mixture was then filtered and the filtrate concentrated to 240 gms. by distillation of the excess n-butyl alcohol at atmopheric pressure, followed by a vacuum distillation of the remaining butyl alcohol at 77° C. The resulting product was an almost colorless free-flowing liquid. The yield was 138.1 gms. equivalent to 97% of the theoretical.

56.5 gms. of the crude product was then distilled under a reduced pressure of 0.02 mm. of Hg. at a temperature of 92° C. to yield 46.5 gms. of a colorless thin, liquid, butyl ester. This yield was equivalent to 80.3% of the theoretical yield.

A second fraction of distillate, a heavy viscous colorless syrup, easily distinguishable from the first fraction by observation, was then recovered. The second fraction amounted to 6.0 gms., equivalent to a 10.2% yield of theory (or 12.8% if the butyl alcohol lost in the polymerization is taken into account). An analysis of the second distillation fraction indicated the material to be a di-ester or dimer product.

The following table shows a comparison or profile analyses of the calculated $C_{10}H_{18}O_4$ ester, the crude ester product, the distilled ester product, the calculated $C_{16}H_{26}O_7$ di-ester, and the di-ester product:

|  | Calculated $C_{10}H_{18}O_4$ ester | Crude Ester Product | Distilled Ester Product | Calculated $C_{16}H_{26}O_7$ di-ester | Di-Ester Product |
|---|---|---|---|---|---|
| Carbon | 59.41 | 58.96 | 59.06 | 58.18 | 58.22 |
| Hydrogen | 8.91 | 8.98 | 9.04 | 7.88 | 8.30 |
| Saponification No. 278 |  | 288 | 288 | 340 | 333 |
| Hydroxyl No. 278 |  | 260 | 241 | 170 | 165 |

Example 2

The method of Example 1 was followed except that the hydrogen pressure was reduced to 50 p.s.i.g. The reaction temperature was maintained at 125° C. and the reaction time reduced to 1 hour. The crude product after stripping off the excess alcohol was an almost colorless, free-flowing liquid. The yield was equivalent to 97% of theoretical. The crude product was again distilled under reduced pressure and gave a colorless, thin liquid in an amount of 80% of theoretical.

Example 3

The method of Example 1 was followed except that n-propyl alcohol was used instead of n-butyl. A portion of the excess n-propyl alcohol was removed from the reaction mixture by concentrating the filtrate to 200 gms. The concentrated filtrate was stripped free of alcohol at 77° C. under a reduced pressure which finally reached 11 mm. of Hg. The resulting product was a clear, free-flowing liquid corresponding to a yield of about 97% of theoretical.

The ester products of the present invention are useful as resin intermediates and the present esters which include alcohol components of 6 carbon atoms or more are aptly suited as plasticizers in resin compositions particularly where a relatively non-volatile plasticizer is required.

What is claimed is:

1. A process of producing esters of hydroxymethyl-tetrahydrofuroic acid which comprises the steps of
   reacting hydrogen, hydroxymethylfuroic acid, and an excess of an aliphatic alcohol having from 1 to 12 carbon atoms,
   in the presence of sufficient supported noble metal catalyst to furnish from about 0.1% to about 5.0% of noble metal, based on the weight of hydroxymethylfuroic acid starting material,
   for a time of between about 0.5 and 3.5 hours,
   at a hydrogen pressure of at least about 30 p.s.i.g.,
   at a temperature of between 25 and 150° C., and
   recovering the formed ester product.

2. The process of claim 1 wherein the noble metal is palladium.

3. The process of claim 1 wherein the supported noble metal catalyst is palladium supported on carbon.

References Cited by the Examiner

Dunlop: The Furans (1953) ACS Monograph No. 119, pages 555 and 706.

NICHOLAS S. RIZZO, *Primary Examiner.*